US010830266B2

(12) United States Patent
Fridlund

(10) Patent No.: US 10,830,266 B2
(45) Date of Patent: Nov. 10, 2020

(54) METHOD FOR FORMING A PANEL

(71) Applicant: Välinge Innovation AB, Viken (SE)

(72) Inventor: Magnus Fridlund, Ahus (SE)

(73) Assignee: VALINGE INNOVATION AB, Viken (SE)

( * ) Notice: Subject to any disclaimer, the term of this patent is extended or adjusted under 35 U.S.C. 154(b) by 156 days.

(21) Appl. No.: 15/432,190

(22) Filed: Feb. 14, 2017

(65) Prior Publication Data

US 2017/0234346 A1     Aug. 17, 2017

(30) Foreign Application Priority Data

Feb. 15, 2016   (SE) ...................................... 1650196

(51) Int. Cl.
| | |
|---|---|
| *F16B 12/22* | (2006.01) |
| *F16B 5/00* | (2006.01) |
| *B27M 1/08* | (2006.01) |
| *A47B 96/20* | (2006.01) |
| *B27M 3/18* | (2006.01) |

(Continued)

(52) U.S. Cl.
CPC .......... *F16B 5/0016* (2013.01); *A47B 96/201* (2013.01); *B27M 1/08* (2013.01); *B27M 3/18* (2013.01); *F16B 12/24* (2013.01); *F16B 12/26* (2013.01)

(58) Field of Classification Search
CPC ........ F16B 5/0016; F16B 12/24; F16B 12/26; A47B 96/201
See application file for complete search history.

(56) References Cited

U.S. PATENT DOCUMENTS

| 291,032 A | 1/1884 | Cleland |
| 634,581 A | 10/1899 | Miller |
| 701,000 A | 5/1902 | Ahrens |

(Continued)

FOREIGN PATENT DOCUMENTS

| CH | 365507 | 11/1962 |
| CH | 685 276 A5 | 5/1995 |

(Continued)

OTHER PUBLICATIONS

U.S. Appl. No. 15/642,757, Peter Derelöv, filed Jul. 6, 2017, (Cited herein as US Patent Application Publication No. 2017/0298973 A1 of Oct. 19, 2017).

(Continued)

*Primary Examiner* — Ryan J. Walters
(74) *Attorney, Agent, or Firm* — Buchanan Ingersoll & Rooney P.C.

(57) ABSTRACT

A method for forming a panel for an assembled product including, such as a furniture product, wherein the method includes: displacing the first panel in a feeding direction by a conveyor through a first edge machine, working, by a first tool of the first edge machine, on a first edge of the first panel to obtain a decided location of the first edge, attaching, by a second tool of the first edge machine, a covering material, such as a laminate strip, a thermoplastic strip or a veneer strip, on the first edge, and forming a first edge groove, by a third tool of the first edge machine, along the first edge and on a first main surface of the first panel, wherein the first edge groove is configured to be a part of a locking device.

19 Claims, 5 Drawing Sheets

(51) Int. Cl.
  *F16B 12/26* (2006.01)
  *F16B 12/24* (2006.01)

(56) References Cited

U.S. PATENT DOCUMENTS

| | | |
|---|---|---|
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 10/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Statsny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott et al. |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan et al. |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan et al. |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan et al. |
| 8,745,952 B2 | 6/2014 | Perra |
| 8,764,137 B2 | 7/2014 | Fehre |
| 8,776,473 B2 | 7/2014 | Pervan et al. |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |

(56) References Cited

U.S. PATENT DOCUMENTS

| | | |
|---|---|---|
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv et al. |
| 10,670,064 B2 | 6/2020 | Derelöv et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens |
| 2011/0283650 A1 | 11/2011 | Pervan et al. |
| 2012/0009383 A1 | 1/2012 | Hardesty |
| 2012/0027967 A1 | 2/2012 | Maertens |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1* | 1/2014 | Gerke .................. B26D 3/065 83/875 |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0298973 A1 | 10/2017 | Derelöv |
| 2017/0360193 A1 | 12/2017 | Boo |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 26 35 237 A | 2/1978 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |

(56) References Cited

FOREIGN PATENT DOCUMENTS

| | | |
|---|---|---|
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/150234 A1 | 12/2008 |
| WO | WO 2009/136195 A1 | 11/2009 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/135874 | 8/2017 |
| WO | WO 2017/138874 A1 | 8/2017 |
| WO | WO 2018/004435 A1 | 1/2018 |
| WO | WO 2018/080387 A1 | 5/2018 |

OTHER PUBLICATIONS

U.S. Appl. No. 15/584,633, Christian Boo, filed May 2, 2017, (Cited herein as US Patent Application Publication No. 2017/0360193 A1 of Dec. 21, 2017).
U.S. Appl. No. 15/646,714, Peter Derelöv, filed Jul. 11, 2017.
U.S. Appl. No. 15/562,254, Peter Derelöv, filed Sep. 27, 2017.
U.S. Appl. No. 15/567,507, Christian Boo, Peter Derelöv and Agne Pålsson, filed Oct. 18, 2017.
U.S. Appl. No. 15/794,491, Peter Derelöv, filed Oct. 26, 2017.
U.S. Appl. No. 15/848,164, Jonas Fransson, Andreas Blomgren and Karl Erikson, filed Dec. 20, 2017.
U.S. Appl. No. 15/923,701, Peter Derelöv, filed Mar. 16, 2018.
U.S. Appl. No. 15/646,714, Derelöv et al.
U.S. Appl. No. 15/562,254, Dereleöv.
U.S. Appl. No. 15/567,507, Boo et al.
U.S. Appl. No. 15/794,491, Derelöv.
U.S. Appl. No. 15/848,164, Fransson, et al.
U.S. Appl. No. 15/923,701, Derelöv.
International Search Report/Written Opinion dated May 9, 2017 in PCT/SE2017/050135, ISA/SE, Patent-och registreringsverket, Stockholm, SE, 10 pages.
Derelöv, Peter, et al., U.S. Appl. No. 15/646,714 entitled "Assembled Product and a Method of Assembling the Product", filed in the U.S. Patent and Trademark Office Jul. 11, 2017.
Derelöv, Peter, U.S. Appl. No. 15/562,254 entitled "Panel with a Slider", filed in the U.S. Patent and Trademark Office Sep. 27, 2017.
Boo, Christian, et al., U.S. Appl. No. 15/567,507 entitled "Panel With a Fastening Device," filed in the U.S. Patent and Trademark Office Oct. 18, 2017.
Derelöv, Peter, U.S. Appl. No. 15/794,491 entitled "Set of Panels with a Mechanical Locking Device", filed in the U.S. Patent and Trademark Office Oct. 26, 2017.
Fransson, Jonas, et al., U.S. Appl. No. 15/848,164 entitled "Device for Inserting a Tongue", filed in the U.S. Patent and Trademark Office Dec. 20, 2017.
Derelöv, Peter, U.S. Appl. No. 15/923,701 entitled "Panels Comprising a Mechanical Locking Device and an Assembled Product Comprising the Panels", filed in the U.S. Patent and Trademark Office Mar. 16, 2018.
U.S. Appl. No. 14/158,165 Peter Derelöv, filed Jan. 17, 2014, (Cited herein as US Patent Application Publication No. 2015/0078819 A1 of Mar. 19, 2015).

(56) References Cited

OTHER PUBLICATIONS

U.S. Appl. No. 14/486,681, Hans Brännström, filed Sep. 15, 2014, (Cited herein as US Patent Application Publication No. 2015/0078807 A1 of Mar. 19, 2015).
U.S. Appl. No. 14/573,473, Peter Derelöv, filed Jan. 17, 2014, (Cited herein as US Patent Application Publication No. 2015/0196118 A1 of Jul. 16, 2015).
U.S. Appl. No. 14/573,572, Christian Boo, filed Dec. 17, 2014, (Cited herein as US Patent Application Publication No. 2015/0198191 A1 of Jul. 16, 2015).
U.S. Appl. No. 14/972,949, Christian Boo, filed Dec. 17, 2015, (Cited herein as US Patent Application Publication No. 2016/0174704 A1 of Jun. 23, 2016).
U.S. Appl. No. 15/171,403, Peter Derelöv, filed Jun. 2, 2016, (Cited herein as US Patent Application Publication No. 2016/0270531 A1 of Sep. 22, 2016).
U.S. Appl. No. 15/271,622, Peter Derelöv, filed Sep. 21, 2016, (Cited herein as US Patent Application Publication No. 2017/0079433 A1 of Mar. 23, 2017).
U.S. Appl. No. 15/308,872, Darko Pervan, filed Nov. 4, 2016, (Cited herein as US Patent Application Publication No. 2017/0089379 A1 of Mar. 30, 2017).
U.S. Appl. No. 15/379,791, Niclas Håkansson, filed Dec. 15, 2016, (Cited herein as US Patent Application Publication No. 2017/0097033 A1 of Apr. 6, 2017).
U.S. Appl. No. 15/366,704, Peter Derelöv, filed Dec. 1, 2016.
U.S. Appl. No. 15/415,356, Peter Derelöv, filed Jan. 25, 2017.
U.S. Appl. No. 15/422,798, Magnus Fridlund, filed Feb. 2, 2017.
U.S. Appl. No. 15/428,469, Magnus Fridlund, filed Feb. 9, 2017.
U.S. Appl. No. 15/428,504, Christian Boo, filed Feb. 9, 2017.
Derelöv, Peter, U.S. Appl. No. 15/366,704 entitled "Panels Comprising a Mechanical Locking Device and an Assembled Product Comprising the Panels", filed in the U.S. Patent and Trademark Office Dec. 1, 2016.
Derelöv, Peter, et al., U.S. Appl. No. 15/415,356 entitled "Panels Comprising a Mechanical Locking Device and an Assembled Product Comprising the Panels", filed in the U.S. Patent and Trademark Office Jan. 25, 2017.
Fridlund, Magnus, U.S. Appl. No. 15/422,798 entitled "Set of Panels for an Assembled Product," filed in the U.S. Patent and Trademark Office Feb. 2, 2017.
Fridlund, Magnus, U.S. Appl. No. 15/428,469 entitled "Element and Method for Providing Dismantling Groove," filed in the U.S. Patent and Trademark Office Feb. 9, 2017.
Boo, Christian, U.S. Appl. No. 15/428,504 entitled "Set of Panel-Shaped Elements for a Composed Element," filed in the U.S. Patent and Trademark Office Feb. 9, 2017.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/027,479, Christian Boo and Peter Derelöv, filed Jul. 5, 2018.
U.S. Appl. No. 15/956,949, Derelöv.
U.S. Appl. No. 15/978,630, Fransson, et al.
U.S. Appl. No. 16/027,479, Boo, et al.
Derelöv, Peter, U.S. Appl. No. 15/956,949 entitled "Panels for an Assembled Product", filed in the U.S. Patent and Trademark Office Apr. 19, 2018.
Fransson, Jonas, et al., U.S. Appl. No. 15/978,630 entitled "Elements and a Locking Device for an Assembled Product," filed in the U.S. Patent and Trademark Office May 14, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office Jul. 5, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
Derelöv, Peter, et al., U.S. Appl. No. 16/361,609 entitled "Panels Comprising a Mechanical Locking Device and an Assembled Product Comprising the Panels," filed in the U.S. Patent and Trademark Office Mar. 22, 2019.
Boo, Christian, U.S. Appl. No. 16/386,732 entitled "Set of Panels With a Mechanical Locking Device," filed in the U.S. Patent and Trademark Office Apr. 17, 2019.
Boo, Christian, U.S. Appl. No. 16/386,810 entitled "Set of Panels With a Mechanical Locking Device," filed in the U.S. Patent and Trademark Office Apr. 17, 2019.
Boo, Christian, U.S. Appl. No. 16/386,824 entitled "Set of Panels With a Mechanical Locking Device," filed in the U.S. Patent and Trademark Office Apr. 17, 2019.
Derelöv, Peter, U.S. Appl. No. 16/386,874 entitled "Symmetric Tongue and T-Cross," filed in the U.S. Patent and Trademark Office Apr. 17, 2019.
U.S. Appl. No. 16/663,603, Magnus Fridlund, filed Oct. 25, 2019.
U.S. Appl. No. 16/663,603, Fridlund.
Fridlund, Magnus, U.S. Appl. No. 16/663,603 entitled "Element and Method for Providing Dismantling Groove," filed in the U.S. Patent and Trademark Office dated Oct. 25, 2019.
U.S. Appl. No. 16/553,325, Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/564,438, Hans Brännström, Agne Pålsson and Peter Derelöv, filed Sep. 9, 2019.
U.S. Appl. No. 16/567,436, Peter Derelöv and Mats Nilsson, filed Sep. 11, 2019.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
Extended European Search Report issued in EP Application No. 17753574.7, dated Aug. 22, 2019, European Patent Office, Munich, DE, 8 pages.
Derelöv, Peter, U.S. Appl. No. 16/553,325 entitled "Set of Panels with a Mechanical Locking Device," filed in the U.S. Patent and Trademark Office Aug. 28, 2019.
Derelöv, Peter, U.S. Appl. No. 16/553,350 entitled "Set of Panels with a Mechanical Locking Device," filed in the U.S. Patent and Trademark Office Aug. 28, 2019.
Brännström, Hans, et al., U.S. Appl. No. 16/564,438 entitled "Assembled Product and a Method of Assembling the Assembled Product," filed in the U.S. Patent and Trademark Office Sep. 9, 2019.
Derelöv, Peter, et al., U.S. Appl. No. 16/567,436 entitled "Panels Comprising a Mechanical Locking Device and an Assembled Product Comprising the Panels," filed in the U.S. Patent and Trademark Office Sep. 11, 2019.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/228,975, Niclas Håkansson and Darko Pervan, filed Dec. 21, 2018.
U.S. Appl. No. 16/697,335, Christian Boo and Peter Derelöv, filed Nov. 27, 2019.
U.S. Appl. No. 16/703,077, Magnus Fridlund, filed Dec. 4, 2019.
U.S. Appl. No. 16/722,096, Peter Derelöv and Christian Boo, filed Dec. 20, 2019.
U.S. Appl. No. 16/722,096, Derelöv et al.
Boo, Christian, et al., U.S. Appl. No. 16/697,335 entitled "Panels Comprising a Mechanical Locking Device and an Assembled Product Comprising the Panels," filed in the U.S. Patent and Trademark Office Nov. 27, 2019.
Fridlund, Magnus, U.S. Appl. No. 16/703,077 entitled "Set of Panels for an Assembled Product," filed in the U.S. Patent and Trademark Office Dec. 4, 2019.

(56) References Cited

OTHER PUBLICATIONS

Derelov, Peter, et al., U.S. Appl. No. 16/722,096 entitled "Panels Comprising a Mechanical Locking Device and an Assembled Product Comprising the Panels," filed in the U.S. Patent and Trademark Office Dec. 20, 2019.

U.S. Appl. No. 16/861,639, Peter Derelöv, filed Apr. 29, 2020.

Derelöv, Peter, U.S. Appl. No. 16/861,639 entitled "Panels Comprising a Mechanical Locking Device and an Assembled Product Comprising the Panels," filed in the U.S. Patent and Trademark Office Apr. 29, 2020.

U.S. Appl. No. 16/946,047, Darko Pervan, filed Jun. 4, 2020.

U.S. Appl. No, 16/915,258, Hans Brännström, Agne Pålsson and Peter Derelöv, filed Jun. 29, 2020.

Pervan, Darko, U.S. Appl. No. 16/946,047 entitled "Mechanical Locking System for Building Panels," filed in the U.S. Patent and Trademark Office Jun. 4, 2020.

Brännström, Hans, et al., U.S. Appl. No. 16/915,258 entitled "Assembled Product and Method of Assembling the Assembled Product," filed in the U.S. Patent and Trademark Office Jun. 29, 2020.

* cited by examiner

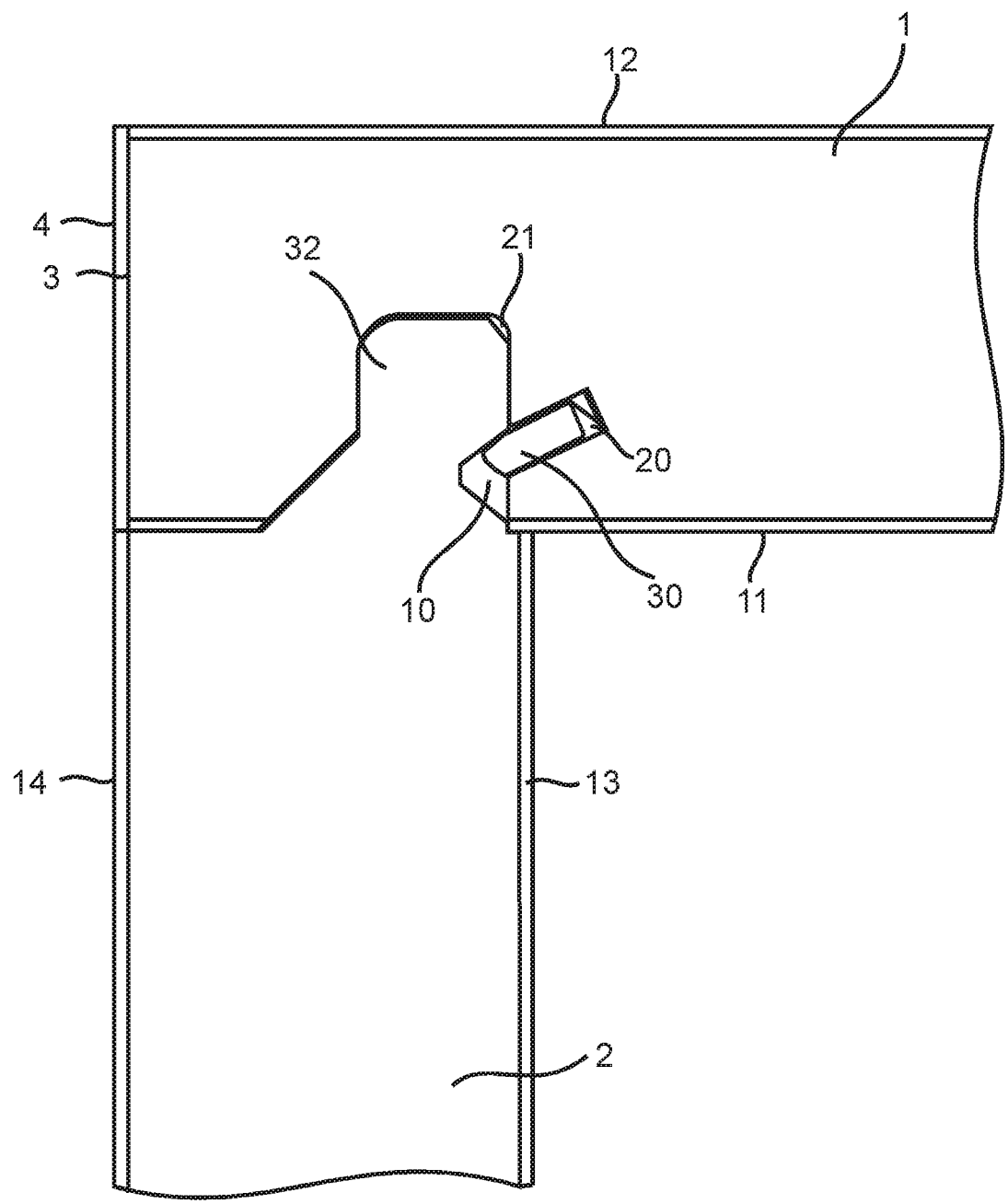

METHOD FOR FORMING A PANEL

CROSS REFERENCE TO RELATED APPLICATIONS

The present application claims the benefit of Swedish Application No. 1650196-7, filed on Feb. 15, 2016. The entire contents of Swedish Application No. 1650196-7 are hereby incorporated herein by reference in their entirety.

FIELD OF THE INVENTION

Embodiments of the present invention relates to panels that are configured to be arranged perpendicular to each other and locked together. The panels may be assembled and locked together to obtain a furniture product, such as a bookshelf, a cupboard, a wardrobe, a box, a drawer or a furniture component. The locking may comprise a flexible tongue.

BACKGROUND OF THE INVENTION

A conventional furniture product may be assembled by a plurality of elements or panels. The panels may be assembled with a mechanical locking system, such as disclosed in, for example, WO 2012/154113 A1. The product comprises a first panel connected perpendicularly to a second panel by a mechanical locking system comprising, an edge tongue at the first panel, an edge groove at the second panel and a flexible tongue in an insertion groove.

For some embodiment situations, it may be desired to cover parts, such as grooves, of a locking system of an assembled furniture product. WO2010/070605 discloses a product assembled by a plurality of panels that are locked by a mechanical locking system. A strip covers some of the edges of the panels.

SUMMARY OF THE INVENTION

Accordingly, embodiments of the present invention preferably seek to mitigate or eliminate one or more deficiencies, disadvantages or issues in the art. A further object of embodiments of the invention is to provide a method for producing a panel for a furniture product that may have the advantage that the locking system is formed and the edges are covered by a covering material in the same production line, and preferably with a continuous flow. Panels may be provided that may be locked together with a mechanical locking system with improved precision.

At least some of these and other objects and advantages that will be apparent from the description have been achieved by a first aspect of the invention including method for forming a first panel for an assembled product, such as a furniture product, wherein the method comprises:
 displacing the first panel in a feeding direction, e.g., by a conveyor through a first edge machine,
 working, by a first tool of the first edge machine, on a first edge of the first panel to obtain a decided location of the first edge,
 attaching, by a second tool of the first edge machine, a covering material, such as a laminate strip, a thermoplastic strip or a veneer strip, on the first edge, and
 forming a first edge groove, by a third tool, e.g., of the first edge machine, along the first edge and on a first main surface of the first panel, wherein the first edge groove is a part of a locking device.

The first edge groove is preferably configured to cooperate with an edge tongue of a second panel for locking the first panel to the second panel, wherein a second main surface of the second panel is essentially perpendicular to the first main surface of the first panel.

The method may provide the advantage that the edge groove may be positioned with improved precision relative an outer surface of the covering material.

The method preferably comprises positioning of the first panel by a positioning device, such that the first panel is at a same position relative the conveyor at least between said the attaching of the covering material by the second tool and said forming of the first edge groove by the third tool. The positioning device may be a part protruding from the conveyor. The conveyor may comprise a lower chain track and an upper belt. The positioning device may protrude from the lower chain track.

The working by the first tool is preferably performed before the attaching of the covering material by the second tool, and the attaching of the covering material by the second tool is preferably performed before the forming the first edge groove by the third tool. This may mitigate or eliminate the problem that a crack arises at the edge groove when the covering material attached.

The method may comprise forming, by a fourth tool of the machine, an inserting groove in the first edge groove.

The method may comprise inserting a tongue, by a fifth tool of the machine, in the inserting groove.

The method may comprise displacing the third tool in a direction with an angle to the first main surface of the first panel, the angle is preferably an essentially right angle, such that the first edge groove may end at a distance from a third edge, which is adjacent to the first edge.

The method may comprise:
 working, by a sixth tool of the first edge machine, on a second edge of the first panel to obtain a decided location of the second edge, which is opposite the first edge,
 attaching, by a seventh tool of the first edge machine, a covering material, such as a laminate strip, a thermoplastic strip or a veneer strip, on the second edge,
 forming a second edge groove, by an eighth tool of the first edge machine, along the second edge and on the first main surface of the first panel, wherein the second edge groove is configured to be a part of a locking device.

The second edge groove is preferably configured to cooperate with an edge tongue of a second panel for locking the first panel to the second panel, wherein a second main surface of the second panel is essentially perpendicular to the first main surface of the first panel.

The method comprises positioning of the first panel by a positioning device, such that the first panel is at a same position relative the conveyor at least between said attaching of the covering material by seventh tool and said forming of the second edge groove by the eighth tool.

The working by the sixth tool is preferably performed before the attaching of the covering material by the seventh tool, and the attaching of the covering material by the seventh tool is performed before the forming the second edge groove by the eighth tool.

The method may comprise forming, by a ninth tool of the first edge machine, an inserting groove in the second edge groove.

The method may comprise inserting a tongue, by a tenth tool of the first edge machine, in the inserting groove.

The method comprises may comprise displacing the eighth tool in a direction with an angle to the first main surface of the first, the angle is preferably an essentially right angle, such that the first edge groove ends at a distance from a third edge, which is adjacent to the first edge.

The method may comprise:
  displacing the first panel in a feeding direction by a conveyor through a fourth edge machine,
  working, by a 11th tool of the fourth edge machine, on a fourth edge of the first panel to obtain a decided location of the fourth edge, wherein the fourth edge is adjacent the first edge, and
  forming a third edge groove, by a 13th tool of the fourth edge machine, along the fourth edge and on a first main surface of the first panel, wherein the third edge groove is configured to be a part of a locking device.

The third edge groove is preferably configured to cooperate with an edge tongue of a second panel for locking the first panel to the second panel, wherein a second main surface of the second panel is essentially perpendicular to the first main surface of the first panel.

The method may comprises displacing the 13th tool in a direction with an angle to the first main surface of the first panel, the angle is preferably an essentially right angle, such that the third edge groove ends at a distance from the first edge and at a distance from a second edge which is adjacent to the fourth edge.

The method may comprise:
  working, by a 16th tool of a fourth edge machine, on a third edge of the first panel to obtain a decided location of the third edge, which is adjacent the first edge,
  attaching, by a 17th tool of the fourth edge machine, a covering material, such as a laminate strip, a thermoplastic strip or a veneer strip, on the third edge.

A core material of the first and/or the second panel may comprise a wood fibre based board, such as a HDF, MDF, plywood, solid wood or particleboard, or a reinforced plastic board or a wood fibre composite board.

The core may be provided with a decorative layer.

The furniture product may be a cabinet, such as a kitchen cabinet, bookshelves, a drawer, a table, a wardrobe or similar.

A second aspect of the invention is a furniture product comprising the first panel produced according to the first aspect. The set of panels may be a part of a frame of the furniture product.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which FIG. 3 shows an embodiment of a first panel, which may be produced according to an embodiment of the invention, locked together with an embodiment of a second panel

DESCRIPTION OF EMBODIMENTS

Figure 1A:
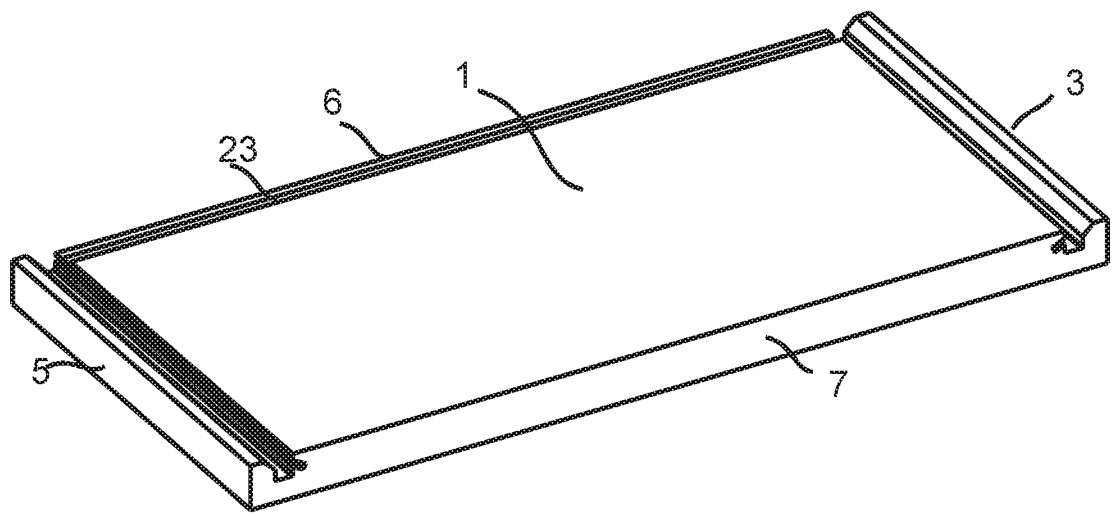
FIGS. 1A-1C show an embodiment of a panel that may be produced according to an embodiment of the invention

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Embodiments of the first panel are shown in FIGS. 1A-1C and FIGS. 2A-2D that may be produced according to embodiments of the invention.

Figure 1B:
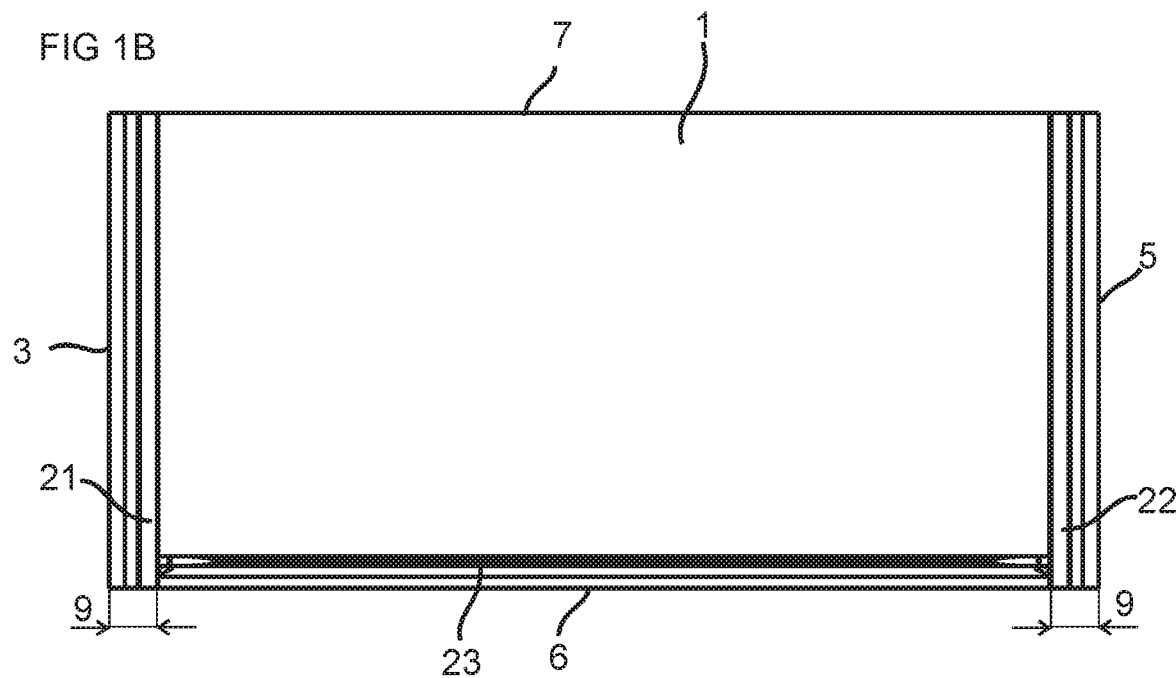
Figure 1C:
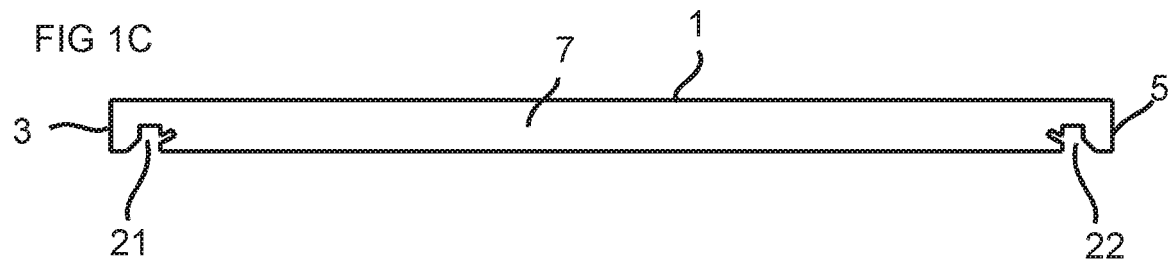

FIG. 1A shows an embodiment of the first panel 1 in a 3D-view. FIG. 1B shows a top view and FIG. 1C shows a side view. The first panel comprises a first edge 3 comprising a first edge groove 21 and a second edge 5 comprising a second edge groove 22. The first edge groove extends along the whole first edge and comprises an opening at an adjacent third edge 7 and an opening at an adjacent fourth edge 6. The second edge groove extends along the whole second edge 5 and comprises an opening at the adjacent third edge 7 and an opening at the adjacent fourth edge 6. The first and the second edges are covered by a covering material. The first and the second edges 3,5 may be side edges of a furniture product and the fourth edge 6 may be a back edge. The third edge 7 may be a front edge that may be covered with a covering material (not shown) that covers the openings of the first edge groove and the second edge groove, respectively. The fourth edge 6 may comprise a third edge groove 23, which preferably ends at a distance 9 from the first edge and the second edge, respectively.

Figure 2A:
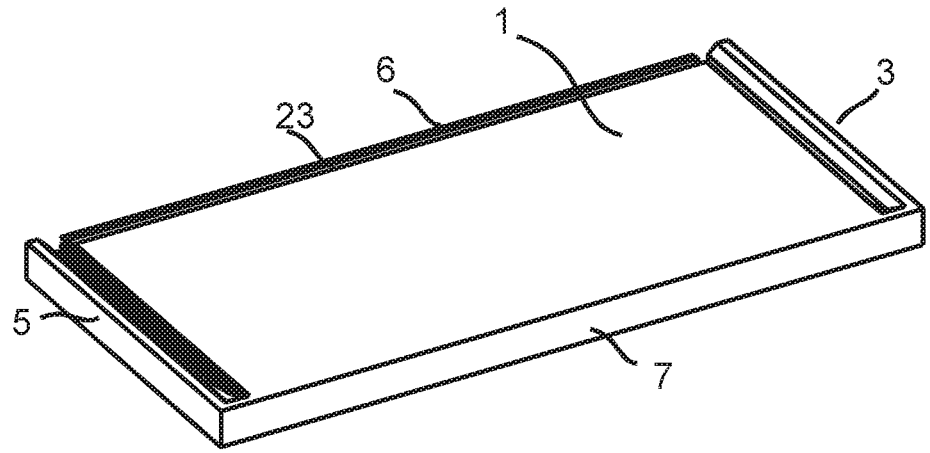
FIGS. 2A-2D show an embodiment of a panel that may be produced according to an embodiment of the invention
Figure 2B:
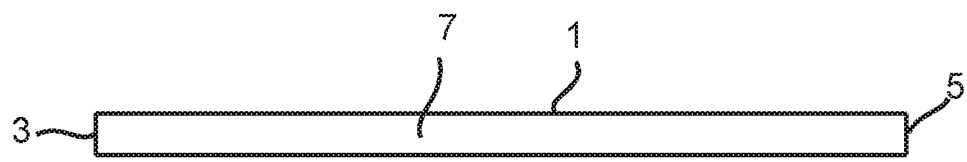
Figure 2C:
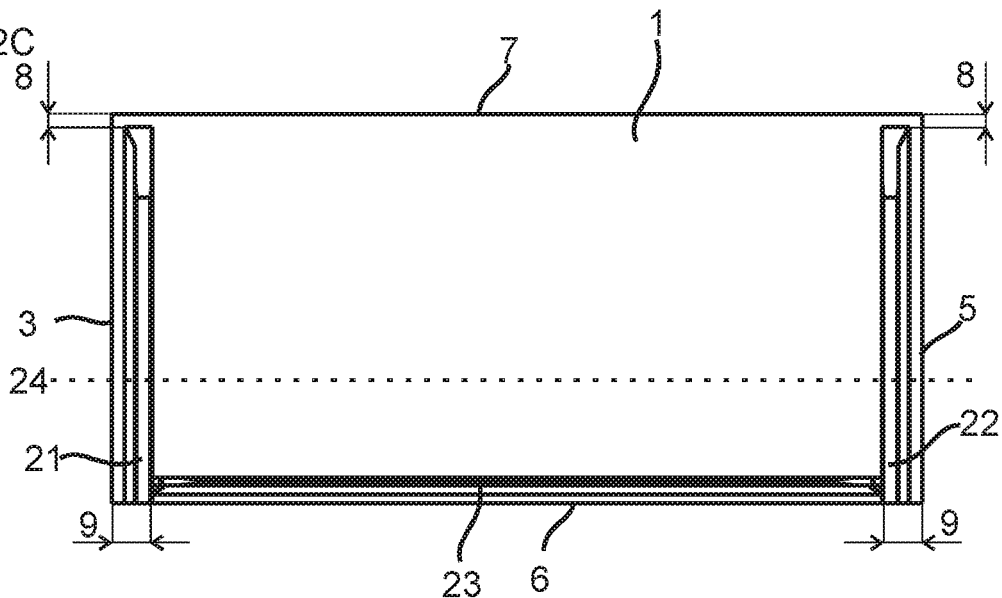
Figure 2D:
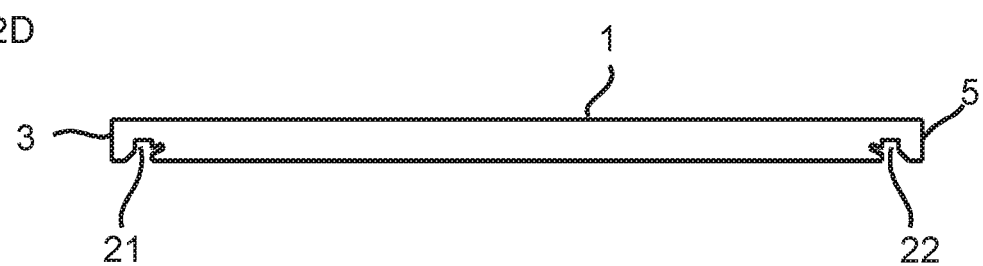

FIG. 2A shows an embodiment of the first panel 1 in a 3D-view. FIG. 2C shows a top view and FIG. 2B shows a side view. FIG. 2D shows a cross cut at the dotted line 24 shown in FIG. 2C.

The first panel comprises a first edge 3 comprising a first edge groove 21 and a second edge 5 comprising a second edge groove 22. The first edge groove extends along the first edge and comprises an opening at an adjacent fourth edge 6. The second edge groove extends along the second edge 5 and comprises an opening at the adjacent fourth edge 6. The first and the second edges are covered by a covering material. The first and the second edges 3,5 may be side edges of a furniture product and the fourth 6 edge may be a back edge. The first and the second edge groove may end at a distance 8 from the third edge 7. The fourth edge may comprise a third edge groove 23, which preferably ends at a distance 9 from the first edge and the second edge, respectively.

FIG. 3 shows an end piece of an embodiment of the first panel. The first panel 1 is locked together by a locking device to a second panel 2. A second main surface 13 of the second panel 2 is essentially perpendicular to a first main surface 11 of the first panel 1 in the shown locked position. The first edge groove 21 is configured to cooperate with an edge tongue 32 of the second panel 2 for locking the first panel 1 to the second panel 2 in a first direction, which is perpendicular to the second main surface 13 of the second panel. The locking device may comprise a flexible tongue 30, which may be arranged in an insertion groove 20 formed in the first edge groove 21, and a tongue groove 10 that may be formed in the edge tongue 32. The flexible tongue is configured to cooperate with the tongue groove for locking the first panel to the second panel in second direction which is perpendicular to the first main surface 11 of the first panel. The first panel 1 comprises a second main surface 12, which is opposite to the first main surface of the first panel. The second panel 2 comprises a first main surface 14, which opposite to the second main surface 13 of the second panel. The first edge 3 is covered by a covering material 4. The first and the second main surfaces of the first and the second panels may each be covered by a decorative layer. An outer surface of the covering material may be in line with an outer surface of the first main surface 14 of the second panel.

Another panel may be locked to the second edge groove of the first panel 1 in the same way as shown in FIG. 3.

Another panel may be locked also to the third edge groove of the first panel in the same way as shown in FIG. 3. For example, three panels may be locked to the first panel.

Figure 4:
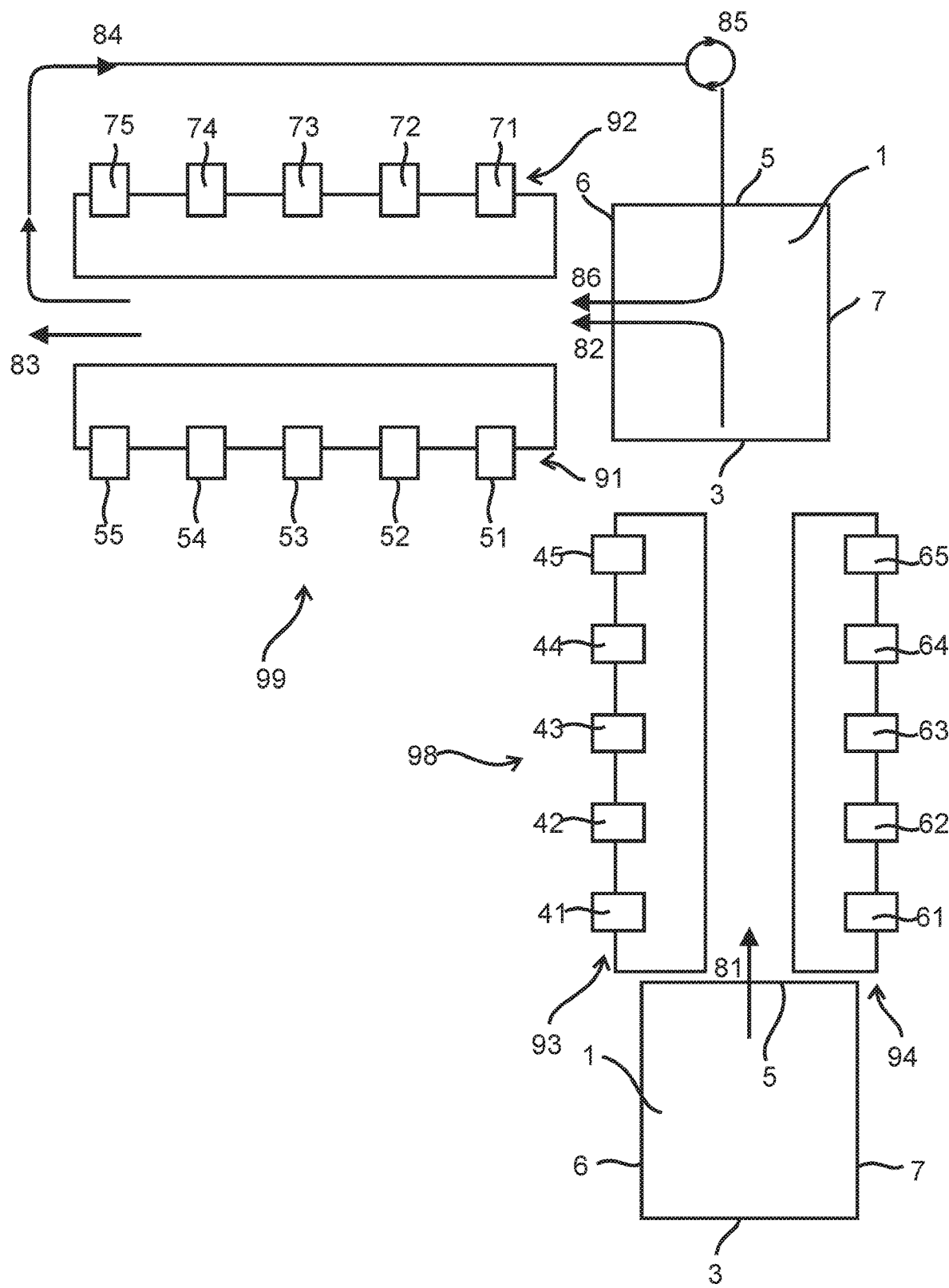
FIG. 4 shows an embodiment of a production line comprising a first edge machine and a fourth edge machine

FIG. 4 shows an embodiment of a production line for producing embodiments of the first panel 1. The production line comprises a first edge machine 99. The first panel is formed by:

- displacing the first panel in a feeding direction 82 by a conveyor through a first edge machine 99,
- working, by a first tool 51 of the first edge machine 99, on a first edge 3 of the first panel to obtain a decided location of the first edge 3,
- attaching, by a second tool 52 of the first edge machine 99, a covering material 4, such as a laminate strip, a thermoplastic strip or a veneer strip, on the first edge 3, and
- forming a first edge groove 21, by a third tool 53 of the first edge machine 99, along the first edge 3 and on a first main surface 11 of the first panel 1.

The first panel may be positioned by a positioning device, such that the first panel is at a same position relative the conveyor at least between said attaching of the covering material by the second tool 52 and said forming of the first edge groove by the third tool 53. The positioning device may be a part protruding from the conveyor. The conveyor may comprise a lower chain track and an upper belt. The positioning device may protrude from the lower chain track. The first panel may be arranged with the first main surface facing the lower chain track. This may have the advantage that thickness variations of the first panel may not affect a location of the first edge groove relative the first main surface.

The working by the first tool 51 is performed before the attaching of the covering material 4 by the second tool 52, and the attaching of the covering material 4 by the second tool 52 is performed before the forming the first edge groove 21 by the third tool 53.

The forming of the first edge groove 21, by the third tool 53, may comprise mechanical cutting, such as milling.

The third tool may be displaced in a direction with an angle to the first main surface, the angle is may be an essentially right angle, e.g., about 90 degrees, such that the first edge groove ends at a distance 8 from a third edge 7, which is adjacent to the first edge 3. The direction is preferably perpendicular to an axis of rotation of the third tool.

An insertion groove 20 is formed, by a fourth tool 54 of the first edge machine 99, in the first edge groove 21. The forming may comprise displacing the fourth tool in a direction, which is preferably essentially perpendicular to an axis of rotation of the fourth tool, such that the insertion groove 20 ends at a distance from the third edge.

A tongue 30 is inserted, by a fifth tool 55 of the first machine, in the insertion groove 20.

A first tool setup comprising the first, second, third, fourth and fifth tools of the first edge machine are arranged on a first side 91 of the first edge machine 99. The shown first edge machine may comprise the same tool setup on a second side 92, which is opposite to the first side, for forming a second edge of the first panel.

Forming of a second edge at a second side 92 of the first edge machine may comprise:

- working, by a sixth tool 71 of the first edge machine 99, on a second edge 5 of the first panel to obtain a decided location of the second edge 5, which is opposite the first edge,
- attaching, by a seventh tool 72 of the first edge machine 99, a covering material, such as a laminate strip, a thermoplastic strip or a veneer strip, on the second edge 5,
- forming a second edge groove 22, by an eighth tool 73 of the first edge machine 99, along the second edge 5 and on the first main surface 11 of the first panel 1, wherein the second edge groove is configured to be a part of a locking device.

The forming may further comprise positioning of the first panel by a positioning device, such that the first panel is at a same position relative the conveyor at least between said attaching of the covering material by seventh tool 72 and said forming of the second edge groove by the eighth tool 73. The positioning device on the second side may be configured as on the first side.

The working by the sixth tool 71 is performed before the attaching of the covering material 4 by the seventh tool 72, and the attaching of the covering material 4 by the seventh tool 72 is performed before the forming the second edge groove 22 by the eighth tool 73.

The eighth tool may be displaced in a direction with an angle to the first main surface of the first panel, the angle is preferably an essentially right angle, e.g., about 90 degrees, such that the first edge groove ends at a distance 8 from a third edge 7, which is adjacent to the first edge 3. The direction is preferably perpendicular to an axis of rotation of the eighth tool.

The forming may comprise forming, by a ninth tool 74 of the first edge machine 99, an inserting groove 20 in the second edge groove 22. The forming may comprise displacing the ninth tool in a direction, which is preferably essentially perpendicular to an axis of rotation of the ninth tool, such that the inserting groove 20 ends at a distance from the third edge.

The forming may comprise inserting a tongue 30, by a tenth tool 75 of the first edge machine 99, in the inserting groove 20.

A second tool setup comprising the sixth, seventh, eighth, ninth and tenth tools of the first edge machine is arranged on the second side 92, which is opposite the first side, of the first edge machine 99.

The embodiment of the production line shown in FIG. 4 comprises a fourth edge machine 98 for forming a third and/or fourth edge 7, 6 of the first panel 1. An alternative embodiment of the production is lacking the fourth edge machine 98. The method for forming a third and/or fourth edge 7, 6 may for the alternative production line comprise the step of a feeding 84 the first panel from the outlet of the first edge machine, rotating the first panel 90 degrees, a feeding 86 into the inlet of the first edge machine and using the first and/or second tool setup for forming the third and/or fourth edge of the first panel. The width of the first edge machine may have to be adjusted before a forming of the third and/or fourth edge. Also the tools may have to be adjusted to another shape of the third and or fourth edge. In order to avoid adjustment it is therefore preferred to have the fourth edge machine 98 in the production line.

The forming of the first panel 1 may comprise:
displacing the first panel 1 in a feeding direction 81 by a conveyor through a fourth edge machine 98,
working, by a 11th tool 41 of the fourth edge machine 98, on a fourth edge 6 of the first panel to obtain a decided location of the fourth edge 6, wherein the fourth edge is adjacent the first edge 3, and
forming a third edge groove 23, by a 13th tool 43 of the fourth edge machine 98, along the fourth edge 6 and on a first main surface 11 of the first panel 1, wherein the third edge groove is configured to be a part of a locking device.

The forming may further comprise displacing the 13th tool in a direction with an angle to the first main surface of the first panel, the angle is preferably an essentially right angle, e.g., about 90 degrees, such that the third edge groove ends at a distance 9 from the first edge 3 and at a distance from a second edge which is adjacent to the fourth edge 6. The direction is preferably perpendicular to an axis of rotation of the 13th tool.

The forming may further comprise:
working, by a 16th tool 61 of a fourth edge machine 98, on a third edge 7 of the first panel to obtain a decided location of the third edge 7, which is adjacent the first edge 3,
attaching, by a 17th tool 62 of the fourth edge machine 98, a covering material 4, such as a laminate strip, a thermoplastic strip or a veneer strip, on the third edge 7.

The fourth edge machine 98 may comprise a third tool setup, comprising the 11th tool and the 13th tool, that is arranged on a first side 93 of the fourth edge machine 98. The third tool set up may also comprise one or more of a 12th tool 42, a 14th tool 44 and a 15th tool 45, which corresponds to the second tool 52, the fourth tool 54 and a fifth tool 55, respectively, of the first tool setup. One or more of the tools of the third tool setup may be used for the forming of the fourth edge of the first panel.

The fourth edge machine 98 may comprise a fourth tool setup, comprising the 16th tool and the 17th tool, that is arranged on a second side 94, which is opposite the first side, of the fourth edge machine 98. The third tool set up may also comprise one or more of a 18th tool 63, a 19th tool 64 and a 20th tool 65, which corresponds to the eighth tool 73, the ninth tool 74 and a tenth tool 75, respectively, of the second tool setup. One or more of the tools of the fourth tool setup may be used for the forming of the third edge of the first panel.

The fourth edge machine 98 may comprise a positioning device on the first and the second side, such that the first panel is at a same position relative the conveyor during the forming. The positioning device may be a part protruding from the conveyor. The conveyor may comprise a lower chain track and an upper belt. The positioning device may protrude from the lower chain track. The fourth edge machine 98 may comprise a guiding device along the first and/or the second side, such that the third edge and the fourth edge are formed parallel.

Figure 5:
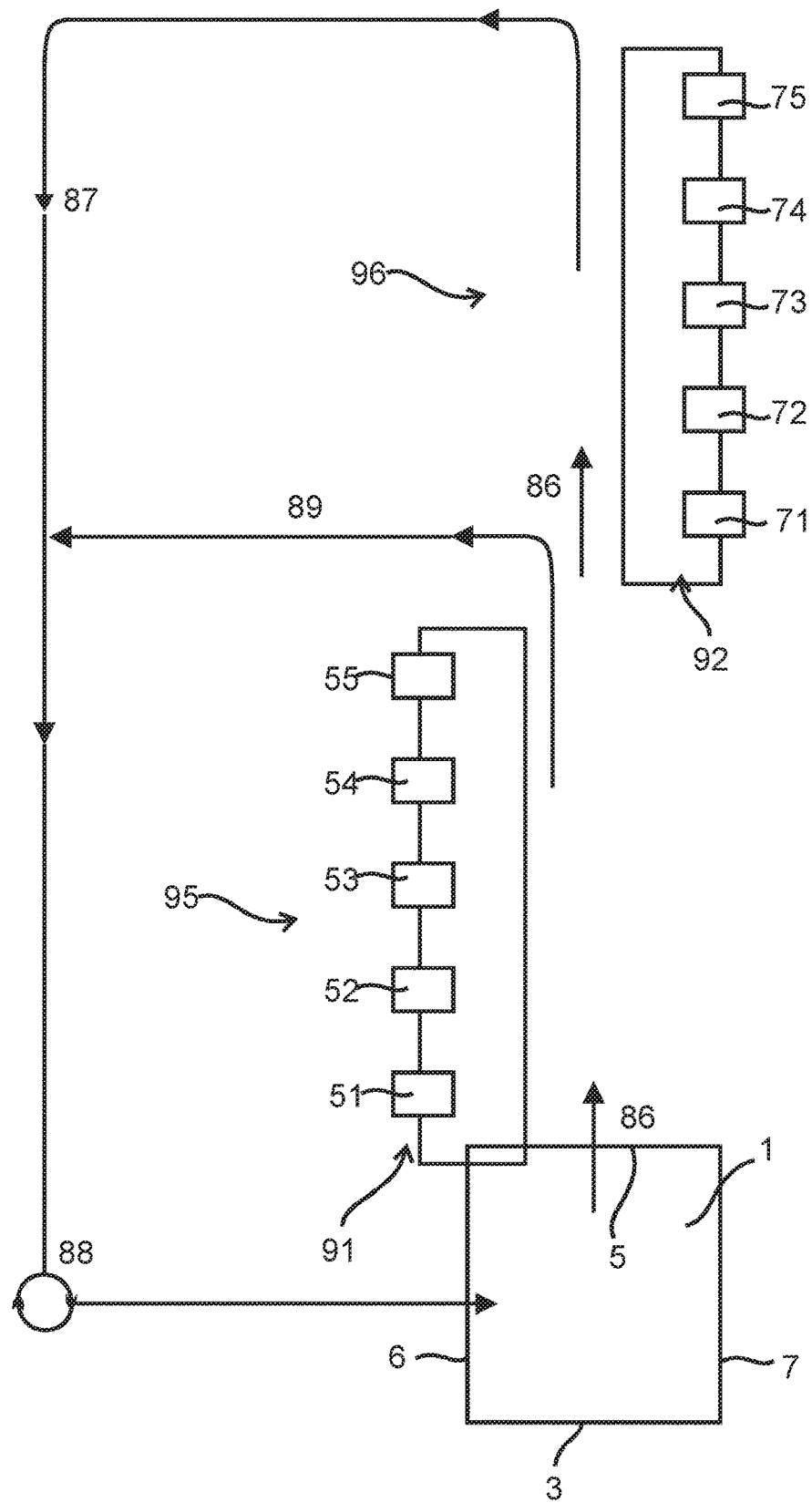
FIG. 5 shows an embodiment of a production line.

An alternative production line shown in FIG. 5 which comprises a first machine 95, which comprises a tool set up that corresponds to the first tool setup of the first edge machine 99, and/or a second machine 96 with a tool setup that corresponds to second tool setup of the first edge machine 99. The first and the second machine may have a conveyor of the same type as the first edge machine.

The first panel 1 may be formed on the first edge 3 and the second edge 5 by displacing 81 the first panel through the first machine 9 and the second machine. The third edge and the fourth edge may be formed by displacing 87 the first panel from the outlet of the second machine to the inlet of the first machine and rotating 88 the first panel 90 degrees before beginning a forming of the third and the fourth edges.

Another embodiment of the alternative production line is lacking the second machine. The first edge may be formed by displacing 86 the first panel 1 through the first machine 95. The second edge may be formed by displacing 87 the first panel from the outlet of the first machine to the inlet of the first machine and rotating 88 the first panel 180 degrees before beginning a forming of the second edge. The third edge may be formed by displacing 89 the first panel from the outlet of the first machine to the inlet of the first machine and rotating 88 the first panel 90 degrees before beginning a forming of the third edge. The fourth edge may be formed by displacing 89 the first panel from the outlet of the first machine to the inlet of the first machine and rotating 88 the first panel 180 degrees before beginning a forming of the fourth edge.

An advantage with this alternative production line may be that an adjustment of the first and/or the second machine due to different widths of the first panel may not be needed. A disadvantage may be that the first panel may have to be displaced two or more times through the first and/or second machine.

One or more of the first tool, the fifth tool, 11th tool and the 16th tool may each comprise a mechanical cutting unit, such as a milling unit, and/or preferably a sanding unit.

One or more of the second tool, the seventh tool, the 12th tool and the 17th tool may each comprise a gluing section.

One or more of the third tool, the eighth tool, the 13th tool, the 18th tool and the 23th may each comprise a mechanical cutting unit, such as a milling unit, and/or preferably The order of the any of the tools, and number of tools, in any of the toll setups may differ from each other, depending of the desired shapes of the first panel.

Forming of the first panel in any of the production lines described above may result in a same final shape of the first panel.

The furniture product may be a cabinet, such as a kitchen cabinet, bookshelves, a drawer, a table, a wardrobe or similar The set of panels described above may be a part of a furniture product, such as a frame.

When the word "about" is used in this specification in connection with a numerical value, it is intended that the associated numerical value include a tolerance of ±10% around the stated numerical value.

EMBODIMENTS

1. A method for forming a first panel (1) for an assembled product, such as a furniture product, wherein the method comprises:
displacing the first panel (1) in a feeding direction (82) by a conveyor through a first edge machine (99),
working, by a first tool (51) of the first edge machine (99), on a first edge (3) of the first panel to obtain a decided location of the first edge (3),
attaching, by a second tool (52) of the first edge machine (99), a covering material (4), such as a laminate strip, a thermoplastic strip or a veneer strip, on the first edge (3), and
forming a first edge groove (21), by a third tool (53) of the first edge machine (99), along the first edge (3) and on a first main surface (11) of the first panel (1), wherein the first edge groove is configured to be a part of a locking device.

2. The method as in embodiment 1, wherein the method comprises positioning of the first panel by a positioning device, such that the first panel is at a same position relative the conveyor at least between said attaching of the covering material by the second tool (52) and said forming of the first edge groove by the third tool (53).

3. The method as in embodiment 1 or 2, wherein the working by the first tool (51) is performed before the attaching of the covering material (4) by the second tool (52), and the attaching of the covering material (4) by the second tool (52) is performed before the forming the first edge groove (21) by the third tool (53).

4. The method as in any one of the embodiments 1-3, wherein the method comprises forming, by a fourth tool (54) of the first edge machine (99), an inserting groove (20) in the first edge groove (21).

5. The method as in embodiment 4, wherein the method comprises inserting a tongue (30), by a fifth tool (55) of the first edge machine (99), in the inserting groove (20).

6. The method as in any one of the embodiments 1-6, wherein the method comprising displacing the third tool in a direction with an angle to the first main surface of the first panel, the angle is preferably an essentially right angle, such that the first edge groove ends at a distance (8) from a third edge (7), which is adjacent to the first edge (3).

7. The method as in any one of the embodiments 1-6, wherein the method comprises:
    working, by a sixth tool (71) of the first edge machine (99), on a second edge (5) of the first panel to obtain a decided location of the second edge (5), which is opposite the first edge,
    attaching, by a seventh tool (72) of the first edge machine (99), a covering material (4), such as a laminate strip, a thermoplastic strip or a veneer strip, on the second edge (5),
    forming a second edge groove (22), by an eighth tool (73) of the first edge machine (99), along the second edge (5) and on the first main surface (11) of the first panel (1), wherein the second edge groove is configured to be a part of a locking device.

8. The method as in embodiment 7, wherein the method comprises positioning of the first panel by a positioning device, such that the first panel is at a same position relative the conveyor at least between said attaching of the covering material by seventh tool (72) and said forming of the second edge groove by the eighth tool (73).

9. The method as in embodiment 7 or 8, wherein the working by the sixth tool (71) is performed before the attaching of the covering material (4) by the seventh tool (72), and the attaching of the covering material (4) by the seventh tool (72) is performed before the forming the second edge groove (22) by the eighth tool (73).

10. The method as in embodiment 7 or 8, wherein the method comprises forming, by a ninth tool (74) of the first edge machine (99), an inserting groove (20) in the second edge groove (22).

11. The method as in embodiment 10, wherein the method comprises inserting a tongue (30), by a tenth tool (75) of the first edge machine (99), in the inserting groove (20).

12. The method as in any one of the embodiments 7-11, wherein the method comprises displacing the eighth tool in a direction with an angle to the first main surface of the first panel, the angle is preferably an essentially right angle, such that the second edge groove ends at a distance (8) from a third edge (7), which is adjacent to the first edge (3).

13. The method as in any one of the embodiments 1-12, wherein the method comprises:
    displacing the first panel (1) in a feeding direction (81) by a conveyor through a fourth edge machine (98),
    working, by a 11th tool (41) of the fourth edge machine (98), on a fourth edge (6) of the first panel to obtain a decided location of the fourth edge (6), wherein the fourth edge is adjacent the first edge (3), and
    forming a third edge groove (23), by a 13th tool (43) of the fourth edge machine (98), along the fourth edge (6) and on a first main surface (11) of the first panel (1), wherein the third edge groove is configured to be a part of a locking device.

14. The method as in embodiment 13, wherein the method comprising displacing the 13th tool in a direction with an angle to the first main surface of the first panel, the angle is preferably an essentially right angle, such that the third edge groove ends at a distance (9) from the first edge (3) and at a distance from a second edge which is adjacent to the fourth edge (6).

15. The method as in any one of the embodiments 1-14, wherein the method comprises:
    working, by a 16th tool (61) of a fourth edge machine (98), on a third edge (7) of the first panel to obtain a decided location of the third edge (7), which is adjacent the first edge (3),
    attaching, by a 17th tool (62) of the fourth edge machine (98), a covering material (4), such as a laminate strip, a thermoplastic strip or a veneer strip, on the third edge (7).

The invention claimed is:

1. A method for forming a first panel for an assembled product, wherein the method comprises:
    displacing the first panel in a feeding direction by a conveyor through a first edge machine,
    working, by a first tool of the first edge machine, the first panel to obtain a first edge,
    attaching, by a second tool of the first edge machine, a covering material on the first edge, and
    forming a first edge groove, by a third tool of the first edge machine, along the first edge and on a first main surface of the first panel, wherein the first edge groove is parallel to the first edge, and is configured to be a part of a locking device.

2. The method as claimed in claim 1, wherein the method comprises positioning of the first panel by a positioning device, such that the first panel is at a same position relative the conveyor at least between said attaching of the covering material by the second tool and said forming of the first edge groove by the third tool.

3. The method as claimed in claim 1, wherein the method comprising displacing the third tool in a direction with an angle to the first main surface of the first panel, such that the first edge groove ends at a distance from a third edge, which is adjacent to the first edge.

4. The method as claimed in claim 1, wherein the method comprises:
    working, by a sixth tool of the first edge machine, the first panel to obtain a second edge, which is opposite the first edge,
    attaching, by a seventh tool of the first edge machine, a covering material on the second edge,
    forming a second edge groove, by an eighth tool of the first edge machine, along the second edge and on the first main surface of the first panel, wherein the second edge groove is configured to be a part of a locking device.

5. The method as claimed in claim 4, wherein the method comprises positioning of the first panel by a positioning device, such that the first panel is at a same position relative the conveyor at least between said attaching of the covering material by seventh tool and said forming of the second edge groove by the eighth tool.

6. The method as claimed in claim 4, wherein the working by the sixth tool is performed before the attaching of the covering material by the seventh tool, and the attaching of the covering material by the seventh tool is performed before the forming the second edge groove by the eighth tool.

7. The method as claimed in claim 4, wherein the method comprises forming, by a ninth tool of the first edge machine, an inserting groove in the second edge groove.

8. The method as claimed in claim 7, wherein the method comprises inserting a tongue, by a tenth tool of the first edge machine, in the inserting groove.

9. The method as claimed in claim 4, wherein the method comprises displacing the eighth tool in a direction with an angle to the first main surface of the first panel, such that the second edge groove ends at a distance from a third edge, which is adjacent to the first edge.

10. The method as claimed in claim 1, wherein the method comprises:
    displacing the first panel in a feeding direction by a conveyor through a fourth edge machine,
    working, by a 11th tool of the fourth edge machine, the first panel to obtain a fourth edge, wherein the fourth edge is adjacent the first edge, and
    forming a third edge groove, by a 13th tool of the fourth edge machine, along the fourth edge and on a first main surface of the first panel, wherein the third edge groove is configured to be a part of a locking device.

11. The method as claimed in claim 10, wherein the method comprising displacing the 13th tool in a direction with an angle to the first main surface of the first panel, such that the third edge groove ends at a distance from the first edge and at a distance from a second edge which is adjacent to the fourth edge.

12. The method as claimed in claim 1, wherein the method comprises:
    working, by a 16th tool of a fourth edge machine, the first panel to obtain a third edge, which is adjacent the first edge,
    attaching, by a 17th tool of the fourth edge machine, a covering material on the third edge.

13. The method as claimed in claim 1, wherein the locking device is configured for locking the first panel to another panel.

14. The method as claimed in claim 1, wherein the first edge groove is adjacent to the first edge.

15. The method as claimed in claim 1, wherein the first edge is spaced from the first edge groove.

16. The method as claimed in claim 1, wherein the first panel is a wood fibre-based board.

17. A method for forming a first panel for an assembled product, wherein the method comprises:
    displacing the first panel in a feeding direction by a conveyor through a first edge machine,
    working, by a first tool of the first edge machine, the first panel to obtain a first edge,
    attaching, by a second tool of the first edge machine, a covering material on the first edge, and
forming a first edge groove, by a third tool of the first edge machine, along the first edge and on a first main surface of the first panel, wherein the first edge groove is configured to be a part of a locking device,
    wherein the working by the first tool is performed before the attaching of the covering material by the second tool, and the attaching of the covering material by the second tool is performed before the forming the first edge groove by the third tool.

18. A method for forming a first panel for an assembled product, wherein the method comprises:
    displacing the first panel in a feeding direction by a conveyor through a first edge machine,
    working, by a first tool of the first edge machine, the first panel to obtain a first edge,
    attaching, by a second tool of the first edge machine, a covering material on the first edge, and
forming a first edge groove, by a third tool of the first edge machine, along the first edge and on a first main surface of the first panel, wherein the first edge groove is configured to be a part of a locking device,
    wherein the method comprises forming, by a fourth tool of the first edge machine, an inserting groove in the first edge groove, wherein the inserting groove is parallel to the first edge groove.

19. A method for forming a first panel for an assembled product, wherein the method comprises:
    displacing the first panel in a feeding direction by a conveyor through a first edge machine,
    working, by a first tool of the first edge machine, the first panel to obtain a first edge,
    attaching, by a second tool of the first edge machine, a covering material on the first edge, and
forming a first edge groove, by a third tool of the first edge machine, along the first edge and on a first main surface of the first panel, wherein the first edge groove is configured to be a part of a locking device,
    wherein the method comprises forming, by a fourth tool of the first edge machine, an inserting groove in the first edge groove,
    wherein the method comprises inserting a tongue, by a fifth tool of the first edge machine, in the inserting groove.

* * * * *